April 10, 1956     W. F. AUSTIN     2,741,242
FORCED FLOW AIR HEATING AND WATER HEATING FURNACE
Filed June 16, 1953     5 Sheets-Sheet 5
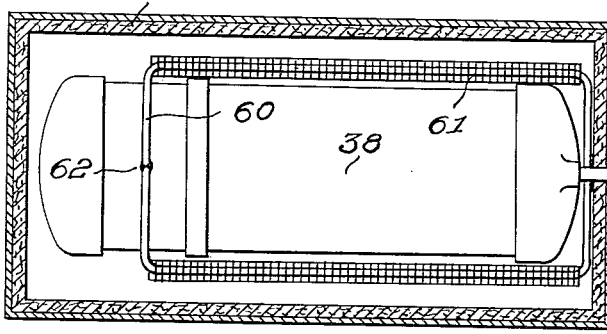
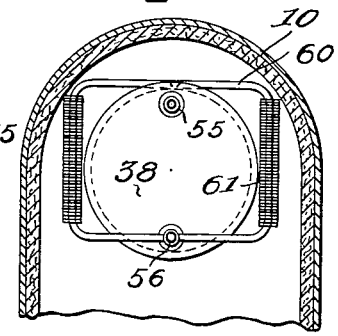
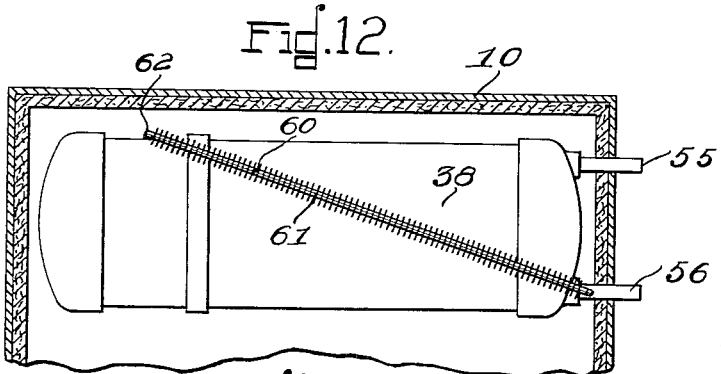
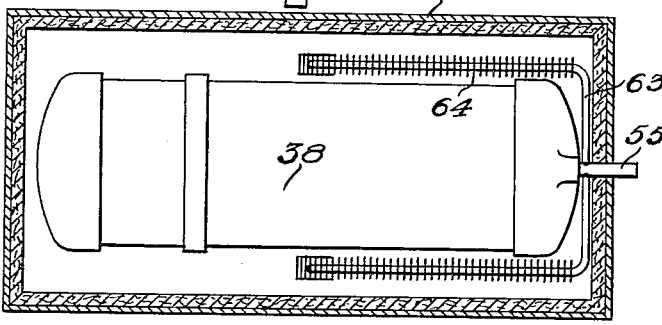
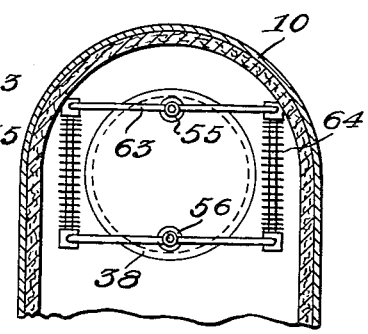
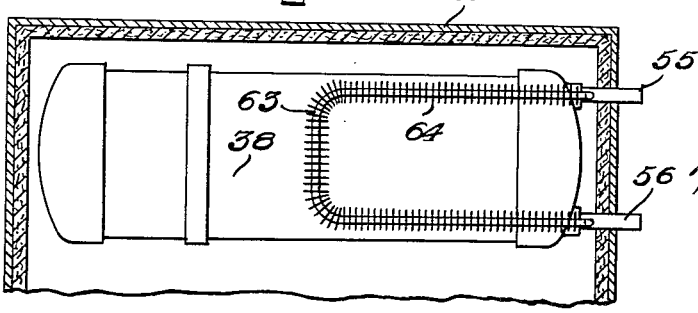
INVENTOR.
Wendell F. Austin United States Patent Office 2,741,242
Patented Apr. 10, 1956

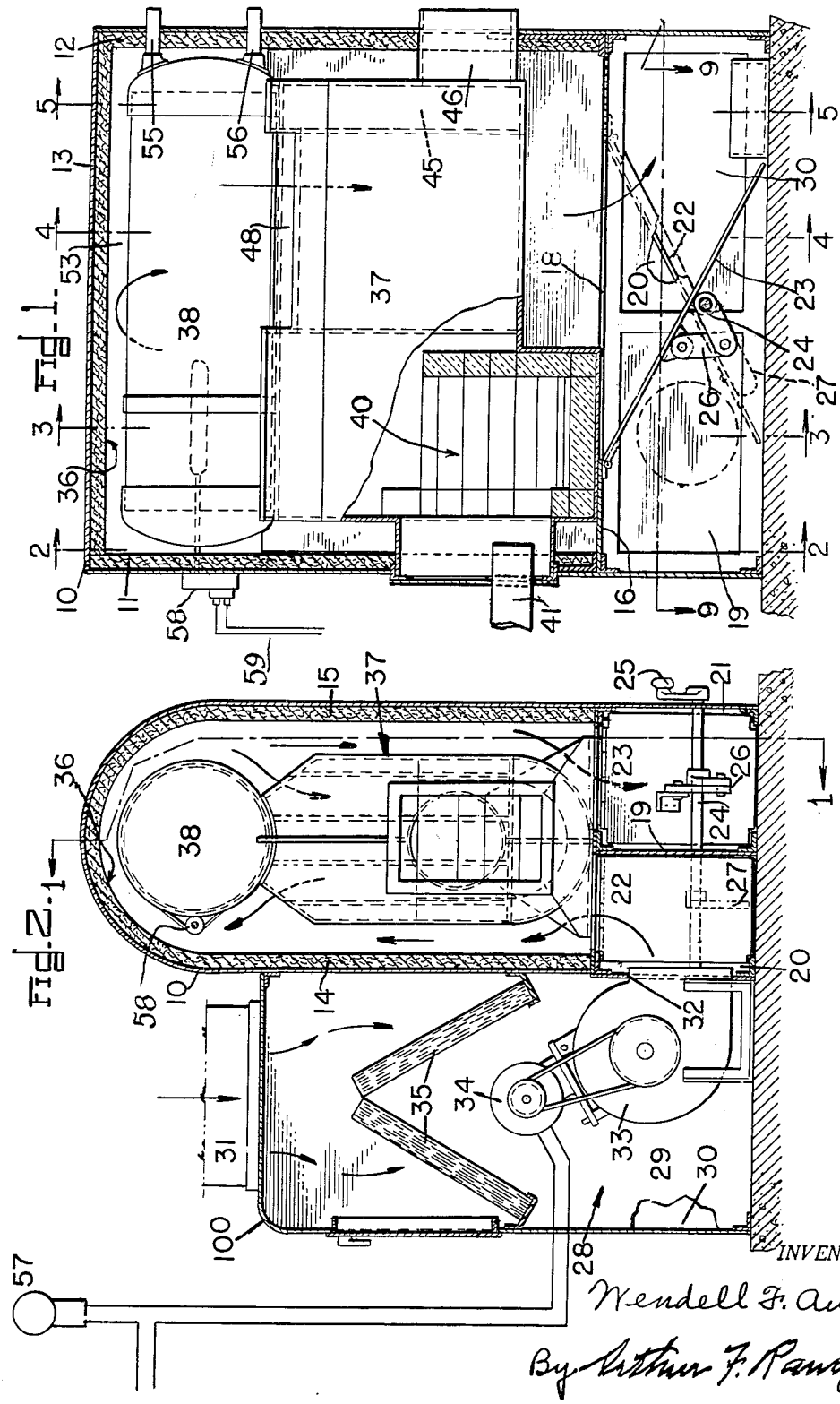

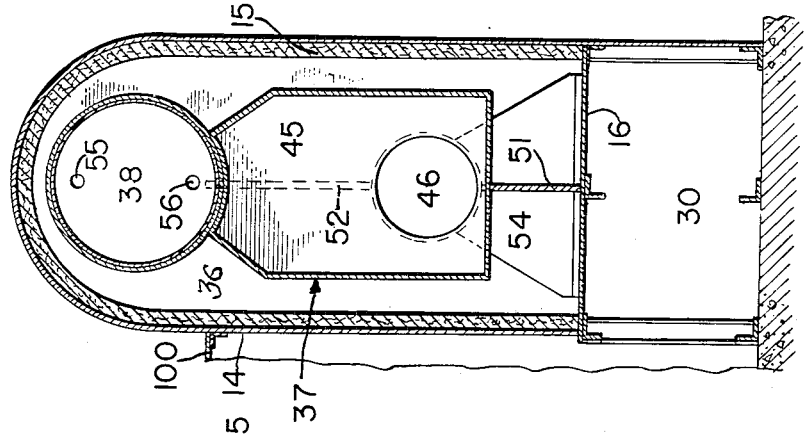

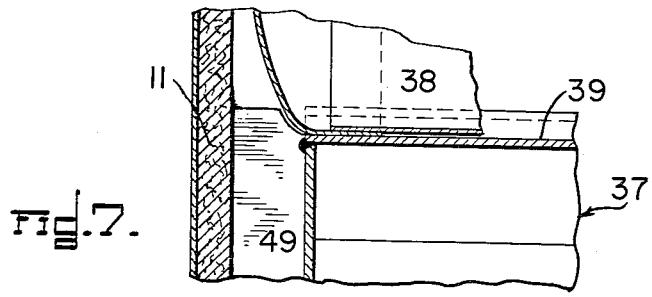
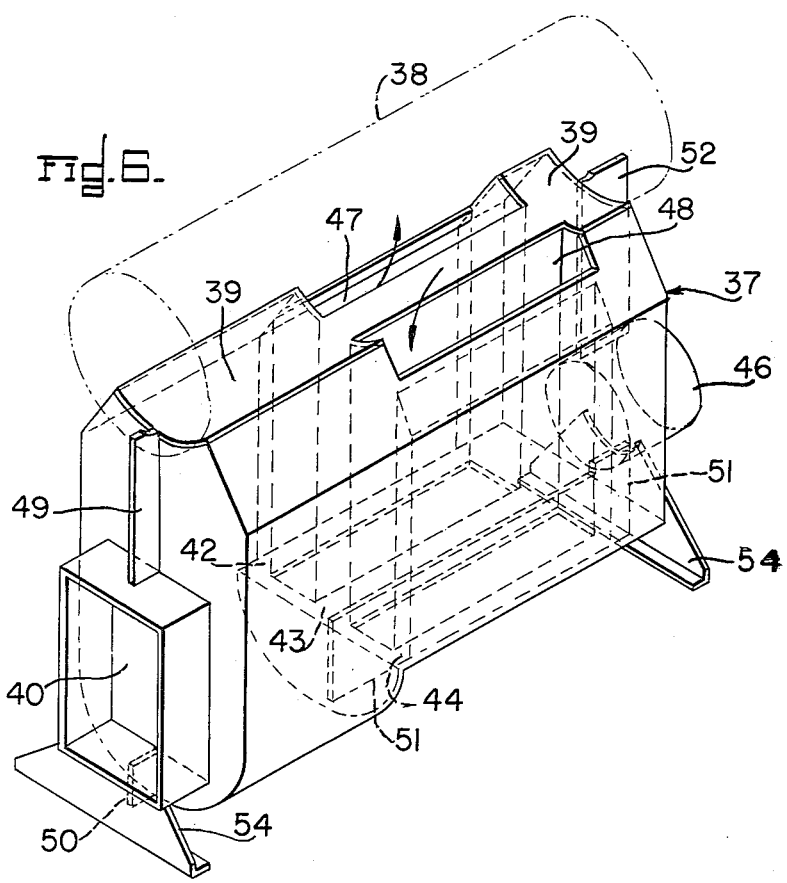

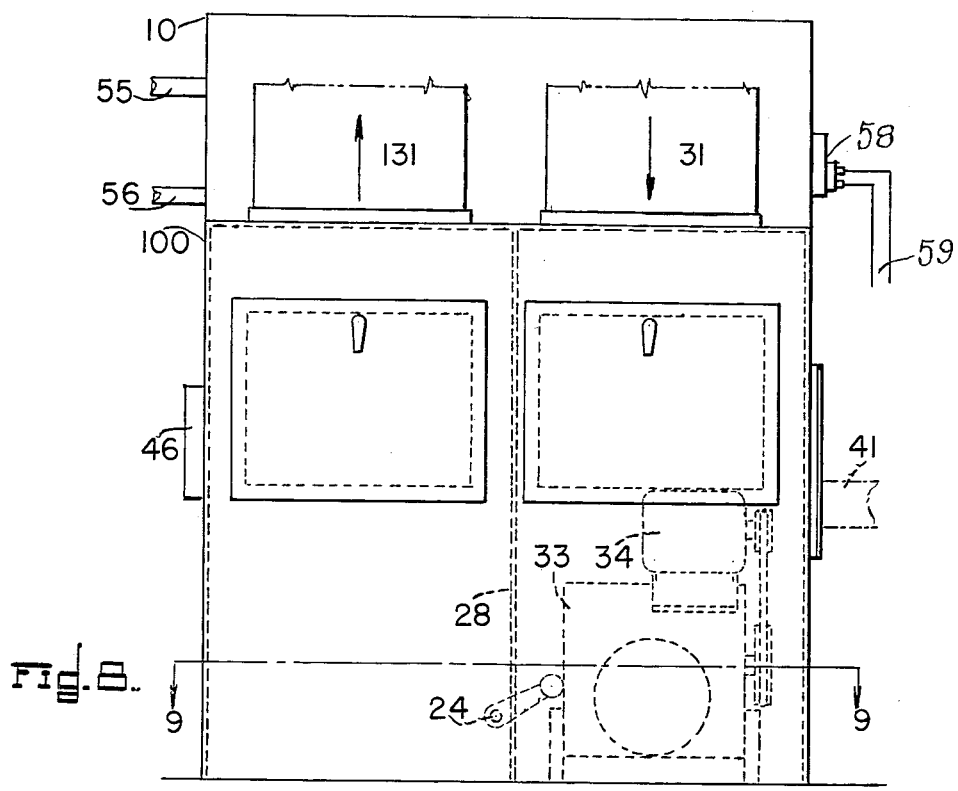
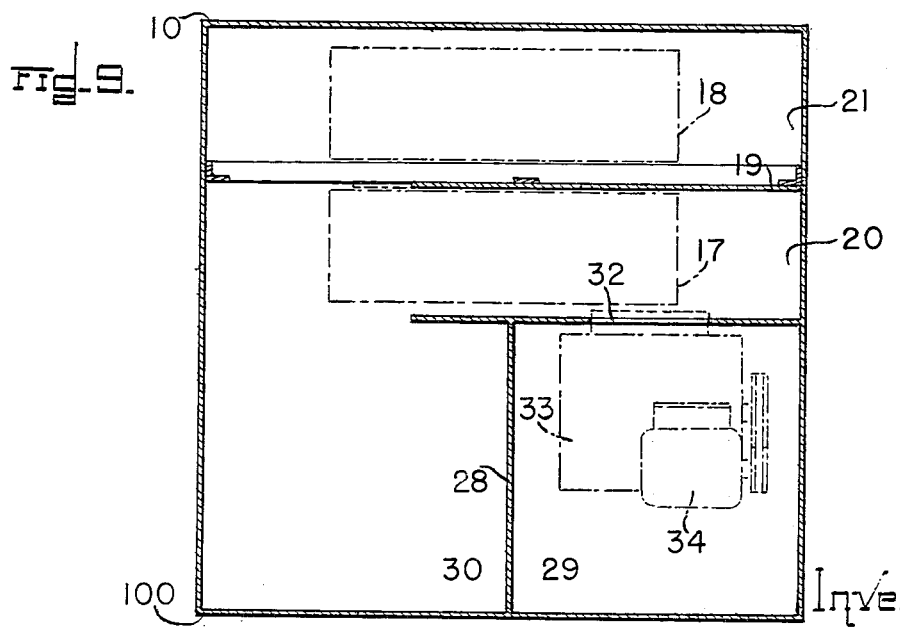

2,741,242

FORCED FLOW AIR HEATING AND WATER HEATING FURNACE

Wendell F. Austin, Everett, Mass., assignor to Metromatic Manufacturing Co., Inc., Medford, Mass.

Application June 16, 1953, Serial No. 362,112

9 Claims. (Cl. 126—101)

This invention relates to water and air conditioning furnaces of the class shown and described in my Patent No. 2,212,222, dated August 20, 1940, and its primary object is to provide an improved furnace of that class.

This present application is an improvement on my prior application Serial No. 70,650, filed January 13, 1949, and which is now abandoned.

A furnace of the class referred to is operable, under one condition of adjustment, to supply both hot water and heated air to a building or apartment and under another condition of adjustment, to supply hot water only to said building or apartment. Thus the first condition of adjustment is appropriate for the cold winter months of a year and the second condition of adjustment is appropriate for the warm summer months of the year. This mode of operation is characteristic of the structure described and claimed in my aforesaid patent and also of the structure of the present invention.

In the furnace of the aforementioned patent the hot water system of the building or apartment includes a manifold or the like disposed within a chamber of the furnace which also contains a metallic heater unit, means being provided to circulate air through said chamber during winter operation which is heated by said unit and which transmits heat from said heater unit to the manifold of the hot water system by convection and not through conduction.

In accordance with the present invention the manifold is likewise metallic but is an annex of the metallic heater unit so that heat from the heater unit is transmitted thereto principally by conduction instead of by convection as heretofore. Thus, in accordance with the present invention, the water manifold receives heat mainly through direct connection with the heat exchanger and transmits the same to the air that is passing through said chamber on its way to the building or apartment during normal winter operation. In other words, during normal winter operation, the manifold functions as a radiator to heat the air moving through the furnace, which avoids overheating of the manifold during such time.

A further, and important feature of the present invention is the provision of heat balancing coils in communication with the manifold which serves the two-fold function of keeping the water temperature down in the manifold during building heat demands and which also speeds the heat recovery of the water in the manifold when heat is not being delivered to the building.

Other features of this invention are hereinafter pointed out.

In the accompanying drawings:

Figure 1 is a vertical sectional view of a furnace constructed in accordance with this invention taken on the line 1—1 of Figure 2.

Figure 2 is a vertical sectional view taken on the line 2—2 of Fig. 1.

Figure 3 is a vertical sectional view taken on the line 3—3 of Figure 1.

Figure 4 is a vertical sectional view taken on the line 4—4 of Fig. 1.

Figure 5 is a vertical sectional view taken on the line 5—5 of Figure 1.

Figure 6 is a perspective view of the heat exchanger, or heating unit, hereinafter described.

Figure 7 is a sectional detail hereinafter referred to.

Figure 8 is an elevation of the furnace as viewed from the left in Fig. 2.

Figure 9 is a horizontal section on lines 9—9 of Figures 1 and 8.

Figure 10 is a transverse sectional view of the upper portion of the housing and showing only the manifold therein, and wherein the manifold is provided with a heat balancing coil.

Figure 11 is a transverse vertical sectional view of the upper portion of the housing and showing the coil in end view in operative association with the manifold.

Figure 12 is a longitudinal vertical sectional view of the upper portion of the housing and showing the coil in side elevation in its operative association with the manifold.

Figures 13, 14 and 15 are views respectively corresponding to Figures 10, 11 and 12 but showing a modified form of heat balancing coil.

The illustrated embodiment of this invention comprises a main housing 10 constructed with a front wall 11; a rear wall 12; a top wall 13, and two oppositely disposed side walls 14 and 15 (Figures 1 to 5, inclusive).

Near its base the housing 10 is provided with a horizontal partition 16 having two rectangular ports 17 and 18 which are indicated by broken lines in Figure 9 for the reason that they are above the plane on which that sectional view in Fig. 9 is taken. The space below the horizontal partition 16 is provided with a vertically disposed partition 19 which is between the two ports 17 and 18 as shown in Figure 9, said partition providing the interior of the lower portion of the housing with an air inlet compartment 20 and an air outlet compartment 21. This partition 19 is joined at its forward end with the front wall 11 of the housing 10 but its opposite end terminates short of the rear wall 12 of said housing as shown in Figs. 1 and 9.

Within the air inlet compartment 20 is arranged a damper 22 for controlling the port 17 while within the air outlet compartment 21 is arranged a damper 23 for controlling the port 18, Figs. 1, 2 and 9. Each damper 22 and 23 is pivotally connected at its one end to the under side of the horizontal partition 16 so that it can be swung up and down to open and close the port controlled by it and for other purposes to be described. In Figures 1 and 2 of the drawings the two dampers 22 and 23 are shown in the positions to be occupied by them during the winter cold weather season when the furnace is being utilized to heat the building or apartment. During the summer or warm weather season, the two dampers occupy positions at the limit of their upward movements where they serve to close the two ports 17 and 18 thereby to render the furnace inoperative as a heater for the building or apartment while continuing to maintain the supply of heated water to the latter.

Extending through the two compartments 20 and 21, Figs. 1 and 2, is a rockshaft 24 which is journaled near its opposite ends in bearings provided in the oppositely disposed side walls 14 and 15 and at one end thereof said shaft carries a crank arm 25, Fig. 2, by means of which it is manually adjusted rotatively. Within the compartment 21 the rockshaft 24 is connected by a pair of toggle links 26 with the damper 23 while within the compartment 20 said rockshaft is equipped with a radial arm 27 whose free end is co-operatively associated with the under side of the damper 22. It will thus be clear that when shaft 24 is rotatively adjusted manually in one direction by means of crank-handle 25, both dampers are swung downwardly to the limit of their movements in that direction thereby opening the ports 17 and 18, Figs. 1 and 9. Also, that when shaft 24 is rotatively adjusted manually in the opposite direction by means of crank-handle 25, both dampers are swung upwardly into positions against the under side of partition 16, Fig. 1, thereby closing both ports 17 and 18.

The side wall 14 of housing 10, Fig. 2, is constructed with a housing-extension 100 that is divided interiorly by a partition 28, Figs. 8 and 9, into two chambers 29 and 30, the former communicating at its top with an air-supplying conduit 31 and being provided adjacent to its lower end with an outlet or aperture 32, Figs. 2 and 9, leading into compartment 20, and into which is fitted the outlet snout of a blower 33 whose rotor shaft is belted, as shown, to the armature shaft of an electric motor 34. As shown in Fig. 9, the chamber 30 is always in communication with the rear ends of the compartments 20 and 21, which contain the dampers 22 and 23, and said chamber 30 communicates at its top with a conduit 131, Fig. 8, which in turn, communicates with the building or apartment. Air filtering units 35, Fig. 2, provide a partition within chamber 29 between air conduit 31 and blower 33.

The horizontal partition 16 within the lower portion of main housing 10 provides a relatively large compartment or chamber 36 above the same within which are fixed a metallic heat exchanger or heating unit that is indicated generally at 37 in Figs. 1 and 2, and also a cylindrical metallic hot water manifold 38 that is seated upon the top of the heat exchanger 37, the latter as shown in Fig. 6, provided at its top with a partially cylindrical socket 39 (Fig. 6) into which the manifold is fitted to ensure surface contact between the two.

At its front end the heat exchanger 37 is formed interiorly with a combustion chamber 40 that may be lined, as shown with a suitable fire-resistant material such as fire brick. At 41 in Figs. 1 and 8 is indicated the delivery nozzle of an oil burner by which fuel is delivered into combustion chamber 40.

As shown particularly in Figs. 3 to 6, inclusive, of the drawings, the interior of the heat exchanger 37 immediately to the rear of the combustion chamber 40 thereof is partitioned to provide the same with three horizontal ducts 42, 43 and 44 connecting the combustion chamber 40 with a passageway 45, Figs. 1 and 5, at the rear end of the heat exchanger 37 whose lower portion is connected with a flue 46 leading to a chimney (not shown), and with two vertical ducts 47 and 48 each of which is open at its top and bottom, said last-mentioned ducts alternating with the horizontal ducts 42, 43 and 44.

As shown particularly in Figs. 2 to 6 of the drawings, the heat exchanger 37 and manifold 38 are of less width than the interior of housing 10 so as to provide two vertical passageways, one at each side thereof, which are substantially isolated from each other by the manifold, the heat exchanger and four small vertically disposed partition elements 49, 50, 51 and 52 (Fig. 6), except for a connecting passageway 53 just above the manifold. As shown in Fig. 6, these partition elements may be integrated with the heat exchanger by welding.

The heat exchanger 37 is provided with legs 54 by which it is supported in fixed upright position upon the top of horizontal partition 16, said legs being preferably welded thereto.

When the dampers 22 and 23 occupy positions for winter operation, as shown in Fig. 1, and blower 33, Fig. 2, is operating, air moves into chamber 29 from conduit 31, passes through filters 35 and is then forced by blower 33 into the damper compartment 20, Fig. 2, whose damper 22 directs the same upwardly through port 17, Figs. 3 and 9, into and through the passageway existing between the heat exchanger 37 and housing wall 14 and also into and upwardly through the vertical duct 47, Figs. 4 and 6, of the heat exchanger.

From the heat exchanger the air passes through the passageway 36, Figs. 1 and 2, and thence downwardly between the heat exchanger and wall 15 as well as through the vertical duct 48 of the exchanger. The continued movement of the heated air carries it downwardly through the port 18 of partition 16 against the damper 23, Fig. 1, by which it is directed rearwardly into chamber 30 from which it passes upwardly to the house or apartment through the conduit or flue 131.

During the above described movement of the air through the furnace the burner of the latter is operating either continuously or intermittently according to the manner in which it is controlled by the usual thermostat 58 (Fig. 1) and its products of combustion pass from the combustion chamber 40 through the horizontal ducts 42, 43 and 44 and passageway 45, Figs. 1 and 4, to the outlet flue 46 leading to the chimney thus heating the exchanger which transmits heat to the air through both convection and conduction. At the same time the heat from the products of combustion is transmitted by conduction from exchanger 37 to the manifold 38, and by both conduction and convection from the heated air passing around the manifold to the water contents of the latter.

Water under heat or pressure is supplied to the manifold 38 through a conduit 56, Fig. 1, and is conducted from the manifold to the building or apartment for use by a conduit 55.

During the warm summer days the burner of the furnace will, of course, continue to operate under control of thermostat 58 and the dampers 22 and 23, Figs. 1 and 2, will occupy their uppermost horizontal positions where they maintain the ports 17 and 18, Fig. 9, closed thus completely inclosing the air that is within the chamber 36, Fig. 2, so that when blower 33 is operating the cool air discharged therefrom will be by-passed around chamber 36 and be delivered more or less directly to conduit 131 through compartment 20 and chamber 30, Figs. 2 and 9, to said conduit 131 by which it is conducted to the building or apartment.

At 57 I have shown a thermostatic switch that is disposed within the room or apartment served by the furnace and arranged in the circuit of the blower-operating motor 34, Fig. 2, to control the operation of the blower 33, as usual according to the temperature within the building or apartment.

At 58 in Figs. 1 and 2 is shown a thermostatic switch arranged in the circuit of the burner 41 and controlling the latter so as to prevent overheating of manifold 38.

While the improved structure as above described provides substantially satisfactory results, it has been found that the efficiency thereof was improved by the use of coils which act as heat balancing means and provide for more rapid hot water recovery as well as more rapid room heating.

Forms of coils which have proven satisfactory are more or less diagrammatically illustrated in Figs. 10 to 15, and wherein two different forms thereof are shown, it being apparent that still other coil arrangements are possible within the scope of the invention.

The coil as shown in Figs. 10, 11 and 12 is of the straight line type while that shown in Figs. 13, 14 and 15 is of the trombone type.

The coil 60 of Figs. 10, 11 and 12 is preferably provided with fins 61 and is shown as being connected at one end thereof to the inlet conduit 56 of the manifold 38 and which at its opposite end is connected by suitable means into the upper wall of the manifold as indicated at 62, whereby water in the manifold will circulate through the coil.

The coil 63 shown in Figs. 13, 14 and 15 is also preferably provided with fins 64 and is connected into the manifold inlet and outlet conduits 56 and 55 respectively.

As seen, the finned portions of the coils are disposed within the chamber 36 wherein there is a strain of air and the coils consequently function as heat balancing coils. That is, when the heating vent is in operation the air flowing through chamber 36 is at a lower temperature than that of the water in the manifold 38 thereby keeping the water temperature down during the period of heat demand. Furthermore, the speed of hot water recovery is aided when there is no demand for heat at which time the air surrounding the manifold is initially at a higher temperature than the water in the manifold.

From the above description it will be clear that when the dampers 22 and 23 are open the manifold 38 serves as a radiator to heat the air moving through the furnace thus avoiding overheating of the manifold. Also, the manifold stores heat between operations of blower 33 during the winter time so that when room thermostat 57 calls for heat the latter is always available for instant service. This gives desirable control of temperature for the building or apartment to be heated.

The water temperature is controlled throughout the year and due to the fact that the furnace is operated throughout the year rusting of the parts thereof due to moisture in the atmosphere is avoided.

Having thus set forth my invention in accordance with a preferred structural embodiment thereof, what I claim and desire to secure by U. S. Letters Patent is:

1. A furnace of the class described, comprising a main housing defined by opposite end walls, opposite side walls, and a top wall, a horizontal partition in said housing in vertically spaced relation to the lower end thereof and dividing said housing into an upper and a lower chamber, a vertical partition beneath said horizontal partition intermediate said side walls and parallel therewith and defining a pair of compartments, air inlet connections to one of said compartments and air outlet connections from the other of said compartments, said horizontal partition being provided with a rectangular inlet air port adjacent one side wall in communication with said compartment having the air inlet connection, said horizontal partition being further provided with a rectangular outlet air port adjacent the opposite side wall in communication with said compartment having an air outlet connection, a heating unit supported on said horizontal partition intermediate said ports, a hot water manifold supported on the top of said heating unit, the outer walls of said heating unit and said manifold being spaced from the side and top walls of the housing, and partition elements in the longitudinal central vertical plane of said heating unit and disposed between the opposite ends and bottom of same and said opposite end walls of said housing and said horizontal partition providing a chamber for free passage of air from the inlet port to the outlet port, said heating unit being provided with vertical ducts whose upper and lower ends are in communication with said upper chamber and which also provide for free passage of air from the inlet port to the outlet port.

2. The structure according to claim 1, wherein said heating unit is provided with a combustion chamber adjacent one end wall, a flue extending through the opposite end wall, walls defining a passageway in communication with the flue and said heating unit being provided with spaced walls providing ducts in communication with the combustion chamber and flue.

3. The structure according to claim 2, wherein said last mentioned ducts are closed at their upper and lower sides and which include a central one intermediate said first mentioned ducts and one at each of the opposite sides thereof and the upper wall of said heating unit being conformed for seating engagement of said manifold on the top wall of said central duct.

4. The structure according to claim 1, together with a manually controllable damper in each of said compartments said dampers being pivotally supported on said horizontal partition and being movable relative thereto for controlling the air flow capacity of each of said rectangular inlet and outlet ports, and said vertical partition having one end thereof spaced from an adjacent end wall of said housing for by-passing of air upon closure of said ports by the dampers.

5. The structure according to claim 1, together with an extension housing having a vertical partition therein, defining opposed compartments, one of said compartments being provided with an air inlet conduit and a blower in communication with one of said first compartments, and the other of said last compartments being provided with an air outlet conduit and being in communication with both of said first compartments.

6. The structure according to claim 1, wherein said manifold is provided with a heat balancing coil in water circulatory connection therewith, said coil including reaches disposed within said upper chamber.

7. The structure according to claim 6, wherein said reaches are provided with fins.

8. The structure according to claim 6, wherein said reaches are straight.

9. The structure according to claim 6, wherein said reaches include horizontal and vertical portions.

References Cited in the file of this patent
UNITED STATES PATENTS

| Number | Name | Date |
|---|---|---|
| 172,188 | Smith | Jan. 11, 1876 |
| 235,945 | Gould | Dec. 28, 1880 |
| 649,502 | Wills | May 15, 1900 |
| 1,363,555 | Beattie | Dec. 28, 1920 |
| 1,440,867 | Ellison | Jan. 2, 1923 |
| 1,684,118 | Snell | Sept. 11, 1928 |
| 2,130,894 | Muir | Sept. 20, 1938 |
| 2,180,532 | Lee | Nov. 21, 1939 |
| 2,212,222 | Austin | Aug. 20, 1940 |
| 2,263,732 | Johnston | Nov. 25, 1941 |
| 2,387,437 | Goggin | Oct. 23, 1945 |